United States Patent
Adams et al.

(10) Patent No.: US 6,427,071 B1
(45) Date of Patent: Jul. 30, 2002

(54) APPARATUS AND METHOD FOR PROVIDING TRANSPORTING FOR A CONTROL SIGNAL

(75) Inventors: John Adams, Barnegat Light, NJ (US); Robert A. Ruby, Dallas, TX (US); Richard Zaffino, Kirkland, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

(21) Appl. No.: 09/207,370

(22) Filed: Dec. 8, 1998

(51) Int. Cl.⁷ .................................................. H04Q 7/20
(52) U.S. Cl. ........................ 455/403; 370/466; 370/467; 379/229
(58) Field of Search ............................... 379/229, 230; 370/373, 401, 410, 522, 352, 466, 467, 356; 455/403

(56) References Cited

U.S. PATENT DOCUMENTS

| | | | | |
|---|---|---|---|---|
| 5,661,790 A | * | 8/1997 | Hsu .......................... 379/209 |
| 5,890,064 A | * | 3/1999 | Widergen et al. ............ 455/445 |
| 5,917,900 A | * | 6/1999 | Allison et al. ............... 379/230 |
| 5,923,659 A | * | 7/1999 | Curry et al. ................. 370/401 |
| 6,014,557 A | * | 1/2000 | Morton et al. ............... 455/410 |
| 6,094,479 A | * | 7/2000 | Lindeberg et al. ........... 379/230 |
| 6,125,113 A | * | 9/2000 | Farris et al. ................. 370/401 |
| 6,141,342 A | * | 10/2000 | Cheesman et al. .......... 370/410 |

* cited by examiner

*Primary Examiner*—Dwayne Bost
*Assistant Examiner*—Lewis G. West
(74) *Attorney, Agent, or Firm*—Kenyon & Kenyon

(57) ABSTRACT

A method and apparatus facilitate secure communication between a controller and a signaling network. The controller generates messages corresponding to a protocol of the signaling network and wraps them in a second protocol. The wrapped message is carried via a second network to a gateway that unwraps the message and provides it to the signaling network.

15 Claims, 6 Drawing Sheets

APPARATUS AND METHOD FOR
PROVIDING TRANSPORTING FOR A
CONTROL SIGNAL

BACKGROUND OF THE INVENTION

The present invention relates to a method and apparatus for providing transport for a control signal. More particularly, the present invention relates to transporting via a first protocol a control signal of a second protocol to a gateway to a network that utilizes that second protocol.

As communication needs have increased, various network architectures have been proposed to afford users with ever-increasing flexibility in conducting exchanges of information. One such architecture involves providing wireless communications services to enable a user to have mobile access to a communication network.

An example of a known mobile wireless communication architecture is shown in FIG. 8. In this configuration a wireless communication device, 800, can be used to establish communications with, for example, wireline telephone 804 via a wireless communication channel, represented by arrow 802. The channel is typically a radio frequency link controlled by a base station, e.g., 801, responsible for the geographic area or cell in which the device 800 is in use. The base station is under the control of a mobile switching center (MSC), 805, which controls switching of communications between base stations and a public telephone switched network (PSFN) 806. If a call is originated at telephone 804 destined for mobile communication device and the PSTN routes the call to the G-MSC (the Home MSC for this particular MIN:800). The G-MSC sends a control signal to signal transfer point (STP) 807 and that control signal is forwarded to a home location register (HLR) 808 associated with the mobile device 800 that is the intended recipient of the call. The HLR 808 responds with information regarding which MSC the mobile device 800 is currently registered in. The G-MSC then routes the call to the appropriate S-MSC 805 which in turn initiates radio contact through base station 801 with the mobile device.

Over time it has become desirable to incorporate wireless capabilities in an office environment. In this manner, a party associated with a given office and having, for example, a given extension number as in a private branch exchange (PBX) arrangement can have a mobile wireless device and be contactable even when away from a wireline phone associated with the PBX extension number.

The AT&T Wireless Services (AWS) Wireless Office Service (WOS) is a service product that provides in-building and on-campus wireless services in conjunction with a customer's existing communications system (e.g., PBX). The service allows customers to use their internal 4-digit PBX dial plan on their wireless phones and allows them to receive on their wireless phones calls originally made to their PBX phone. These features are available whether the user is in-building, on-campus or roaming away from these areas nationally or even internationally.

Originally, WOS was provided via MSC features, functionality and RF coverage of a macro cellular network. An example of one WOS arrangement that has been proposed is illustrated in FIG. 1. Equipment 101 resides on a customer's premises. It includes a traditional PBX 102 and wireline phones 103, 104 connected to the PBX and each having an extension number associated therewith. If a call is directed to one of the extension numbers, the PBX, can send the call to MSC 106 via PSTN 105 in an attempt to complete a wireless communication to device 110. The MSC 106 can be coupled to a base station 108 that provides coverage for the customer's premises. This could be a base station positioned either on or off the customer's premises. Where RF coverage was adequate, existing macro cells provided in-building and campus coverage. In other instances, new macro cells were deployed or micro cells were installed on the customer premises.

Wireless office systems currently under development aim to exploit the cost and technology curves of commodity computing platforms and consumer-product-like base stations in order to use Customer Premises Equipment (CPE), rather than traditional network infrastructure equipment, to provide the service. Lower equipment costs and the use of CPE are expected to increase the number of vendor and feature options available to customers and to stimulate demand for the service. Additionally, new functionality associated with automating certain RF engineering procedures is expected to lower deployment and operations costs typically borne by the network service provider.

In these newer wireless office systems, the equipment at the customer's location looks and behaves like an MSC/visited Location Register (VLR) combination to the rest of the cellular network. Therefore, they support the IS-41 MAP. At present, IS-41 specifications allow data transfer services using SS7 or X.25. One option would be to treat each wireless office as an endpoint for the signaling network. For example, each such customer premises office could be an SS7 network endpoint with a direct connection into the signaling network.

If growth expectations are met, then the number of signaling endpoints in the network could increase substantially. A preliminary estimate indicates substantial outlays would be required to support wireless office systems customer premises equipment directly on the SS7 signaling network. Considerations other than cost also provide disincentives to terminating the signaling network directly at the customer's premises. These include:

a) access by unauthorized people to SS7 links resulting in potential harm to the signaling network;

b) lack of control over access to facilities by authorized people;

c) reliability of CPE;

d) low link utilization for these wireless office systems (the link to the signaling network would be significantly under-utilized by a single customer premises office system); and e) difficulty for vendors to shoulder development or procurement costs of full signaling network functionality.

Given these disadvantages it would be beneficial if there was another approach available to provide signaling network connectivity to the customer's premises.

SUMMARY OF THE INVENTION

The present invention provides a signal transport mechanism that facilitates communication to a signaling network via existing communication facilities. In accordance with an embodiment of the present invention, a communication device at a customer premises generates a control signal in accordance with a first protocol. The generated control signal is wrapped into a transport mechanism in accordance with a second protocol and transmitted to a gateway. The gateway receives the signal of the second protocol, unwraps the generated control signal and forwards it to a signaling network which is operating with the first protocol. Likewise, the gateway wraps signaling network communications of the first protocol in a package consistent with the second protocol and then provides that package to the communications device for subsequent unwrapping.

In a more specific embodiment, the customer premises communication device includes a controller that emulates a mobile switching center and generates control signals consistent with IS-41 MAP (Mobile Application Part) protocols or GSM MAP protocols and the SS7 standards. The controller wraps an IS-41 message into a signal that comports with TCP/IP and transmits the packaged message over a wide area network to a gateway. At the gateway, the received, IS-41/GSM message is unwrapped and provided to the SS7 signaling network. In turn, the gateway can take SS7 network responses, package them in accordance with TCP/IP requirements and forward the responses to the customer premises communication device.

In accordance with the present invention, the customer premises communications device gains access to an SS7 network without requiring a dedicated connection. Furthermore, a gateway can service multiple customer premises communications devices thereby, enhancing link utilization and sharing the cost of SS7 access over a number of wireless office systems.

DETAILED DESCRIPTION

System Overview

Figure 1:
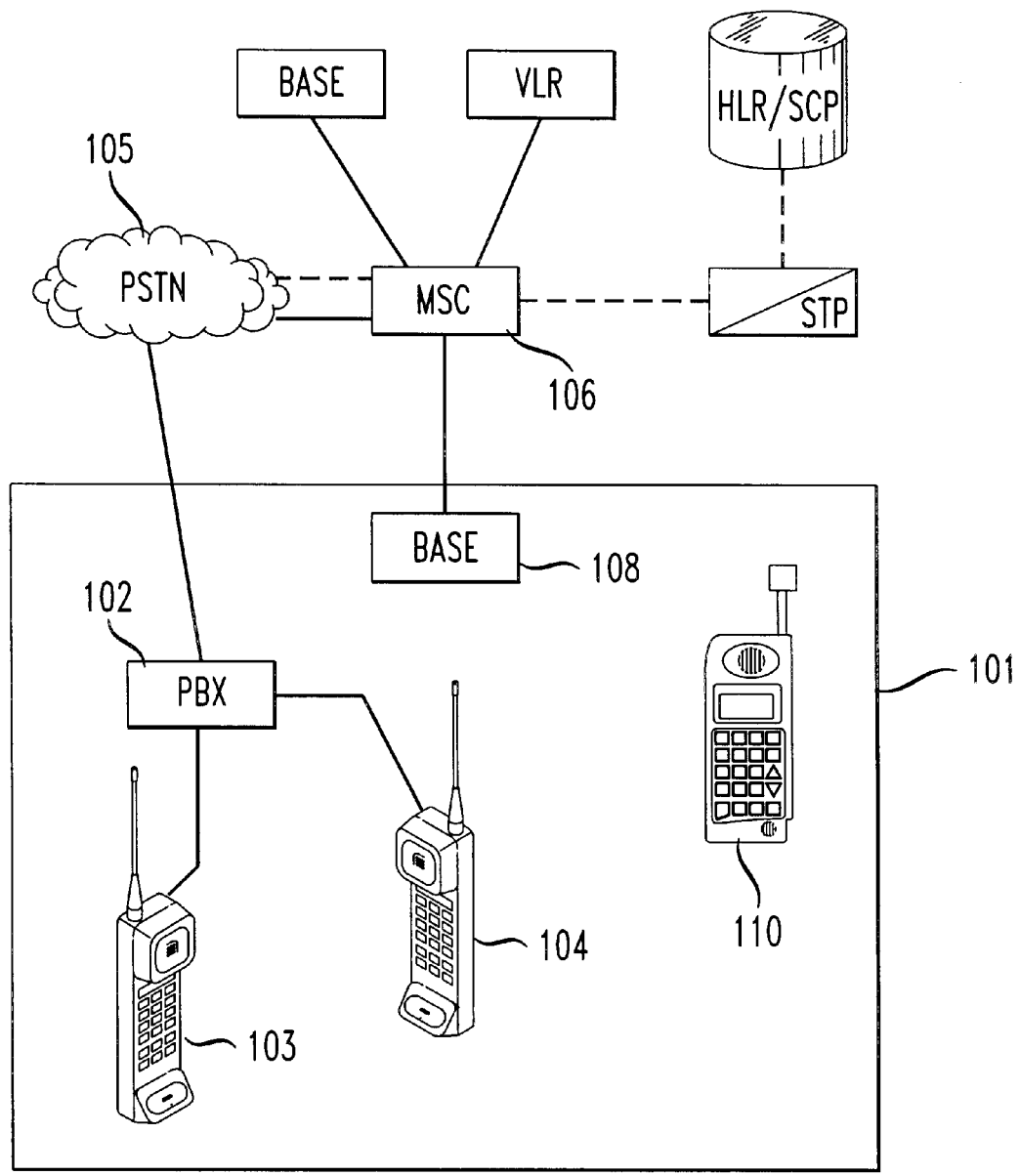
FIG. 1 is a block diagram illustrating a known wireless office system.
Figure 2:
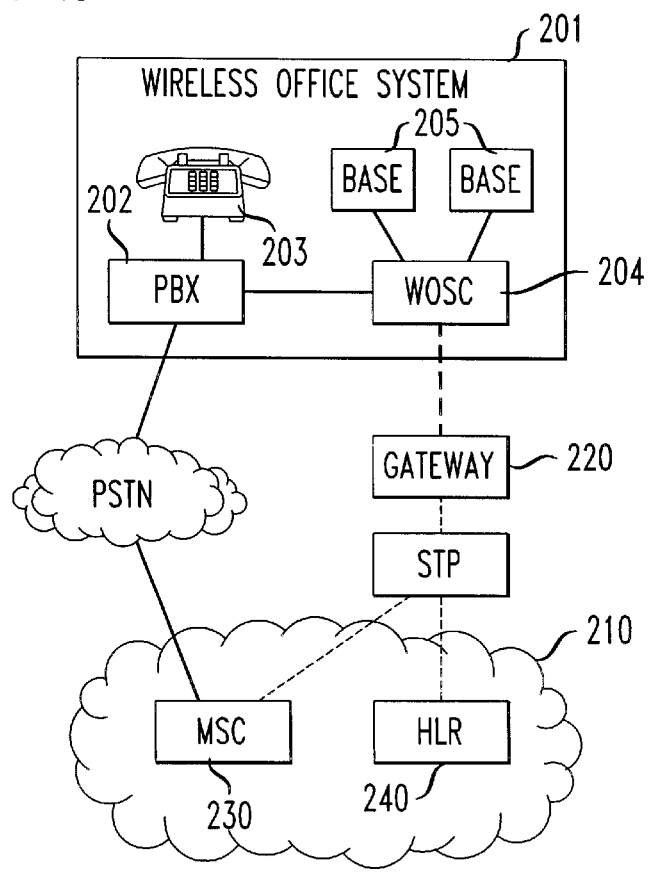
FIG. 2 is a block diagram of a communication system in accordance with an embodiment of the present invention.

In accordance with an embodiment of the present invention, a wireless office system is coupled to a signaling network via a gateway. An example of such an arrangement is illustrated in FIG. 2. In this embodiment customer premises communication equipment forming a wireless office system 201 includes a PBX 202, communications terminal (e.g., telephone 203) coupled to PBX 202 via a wireline, a wireless offices system controller (WOSC) 204 coupled to the PBX and base stations 205 coupled to the WOSC. A wireless communications device, e.g. a wireless telephone (not shown), is capable of establishing a wireless communication link with any of the base stations. The WOSC acts like a mobile switching center (MSC). Further details regarding the WOSC will be described below with reference to FIG. 3. The WOSC generates IS-41 messages just as a network MSC does. To transport those messages to a cellular network, such as that represented by the cloud 210, the WOSC transmits the IS-41 messages over a wide area network (WAN) using a WAN protocol scheme, such as TCP/IP. The messages are packaged in this protocol and forwarded to gateway 220. At the gateway, the IS-41 message is unwrapped and forwarded to a SS7 signaling network. Note that the "unwrapping" involves some processing by the gateway. The latter network transports the IS-41 messages to their appropriate destination, e.g., MSC 230 or HLR 240. The dashed lines between the WOSC 204 and the gateway 220 represent the fact that the communications between these elements are in accordance with one protocol (for example TCP/IP). The dotted lines between the gateway 220 and the MSC 230 and between the gateway 220 and HLR 240 represent the fact that the communications between these elements are in accordance with a second protocol (for example SS7).

In this embodiment then, the WOSC can operate as an MSC, generate SS7 compatible signals and send those signals to an SS7 network without a direct dedicated connection to the network. Instead, the present invention wraps the SS7 compatible signals in a WAN transport protocol. A gateway unwraps the signals and provides them to the SS7. The owner of the gateway can maintain better control over direct access to the signaling network. Furthermore, multiple WOSCs can be assigned to the same gateway thereby enhancing utilization of a signaling network access point.

Figure 4:
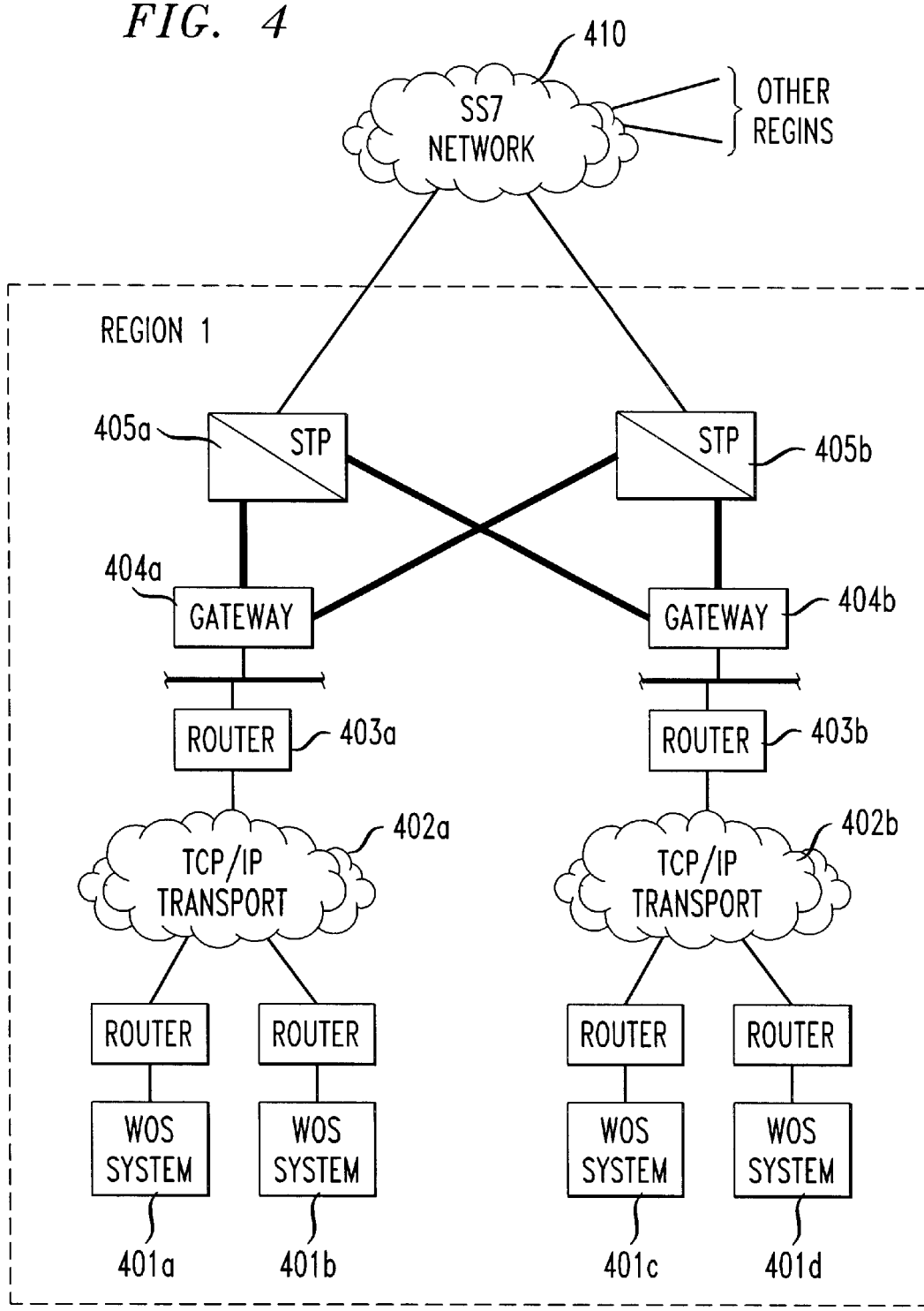
FIG. 4 is a block diagram of a network using an embodiment of the present invention.

An example of this latter system arrangement is illustrated in block diagram form in FIG. 4. The arrangement shows one region configuration (Region 1) coupled to a signaling network 410, e.g. an SS7 network, that can be connected to other similarly configured regions and to regions of differing configurations.

Multiple wireless office systems 401a, 401b, 401c, 401d can be coupled with their controllers, via a TCP/IP transport 402a, 402b, to a router 403a, 403b. The router couples a gateway 404a, 404b to the TCP/IP transport. Each gateway is coupled via SS7 transport to one or more signal transfer points (STPs) 405a and 405b. The STPs are coupled to the SS7 network 410. Thus, as shown, a single gateway can serve as an SS7 network access point for multiple wireless office systems.

As shown, the gateways and WOSCs are connected via a Wide Area Network (WAN) that is capable of transporting TCP/IP data. The WAN selected could support one or two of the following options:

a) Ethernet to router—in this configuration, devices (Gateways or WOS Controllers) would connect to a local Ethernet LAN that would gain access to the WAN via a router or other device (e.g., hub, FRAD (Frame Relay Access Device)) of the appropriate type for the WAN. In this scenario, the device would communicate TCP/IP over Ethernet and the router would provide the interface to the WAN. The device must provide an Ethernet network interface to connect to the LAN; or b) Dial-up via PPP—in this configuration, the WAN selected would be accessed via a local telephony number that terminated at a modem pool and PPP server. The PPP server would then interface to the WAN. In this scenario, the device (Gateway or WOS controller) would provide a modem/telephony interface to dial-up the WAN's modem pool. The device would then communicate TCP/IP over the PPP link.

The above embodiment shows a technique for transporting, with a first transport protocol, a message consistent with a second protocol and then providing that message to a network operating in accordance with the second protocol. This operation is transparent to the user.

Possible embodiments for the WOSC and the gateway will be described below, along with an example of an interface which may be employed between these two system components.

System Architecture

Figure 3:
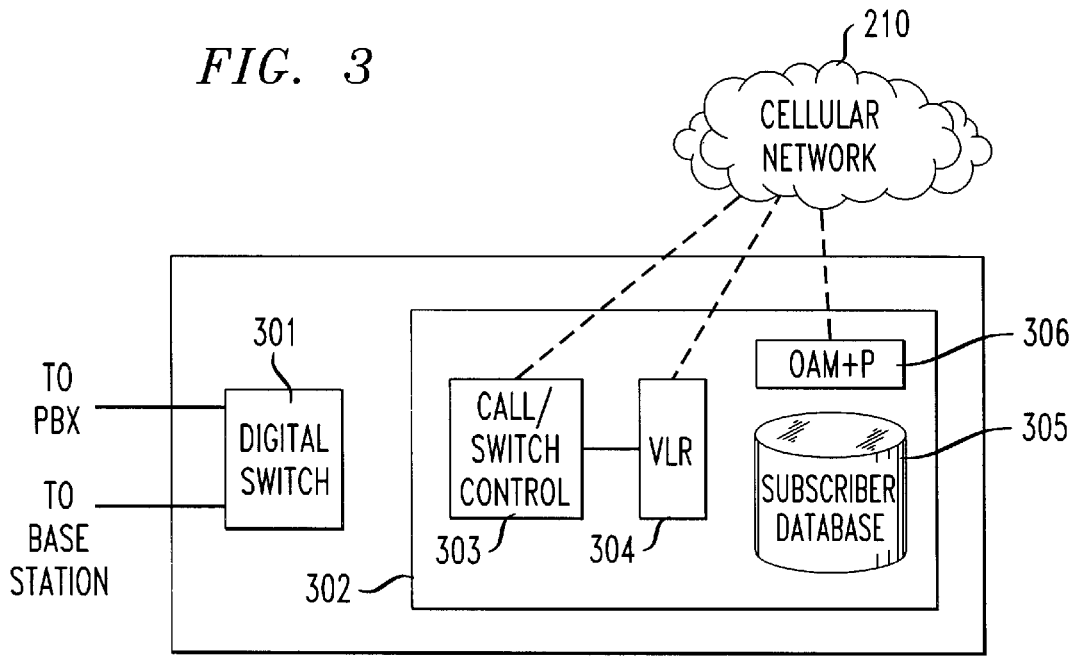
FIG. 3 is a block diagram of an embodiment of a controller 204 of the configuration of FIG. 2.

A more detailed example of the WOSC of FIG. 2 is illustrated in FIG. 3. In this example, the WOSC includes a digital switch 301 that can be connected to the PBX and to one or more base stations. A main controller 302 includes a call/switch controller 303, a visitor location register (VLR) 304, a subscriber database 305 and an Operations, Administration, Maintenance and Provisioning (OAM&P) processor 306. It should be understood that the WOSC as a computer device can take many forms so long as the processor arrangement is capable of executing the appropriate functionality described herein under the control of properly designed software.

In this arrangement, the main controller generates IS-41 or GSM type messages, as would an MSC, to process a call or calls with the equipment. The controller generated signals are to be transmitted to the gateway using a multilayer protocol suite. Without the intervening gateway, the WOSC would generate SCCP messages for transporting TCAP and IS-41 MAP information, and perhaps ISUP (ISDN User Part) call control messages, and pass these directly to the SS7 MTP layer for transport over the SS7 network. With the gateway, a WOSC generates the same TCAP SCCP messages, but encapsulates them in a simple gateway Protocol Message for transport to the gateway.

To provide appropriate security, all communications between the gateway and WOSC could be encrypted. The specifics of security considerations will be further described below. Table 1 shows a protocol suite available for implementing an interface between the WOSC and the gateway.

TABLE 1

| Application | WOSC or Gateway Transfer Manager |
|---|---|
| Encryption | SSL |
| Transport Layer | TCP |
| Network Layer | IP |
| Link Layer | Device Driver and Interface Card |

Figure 5:
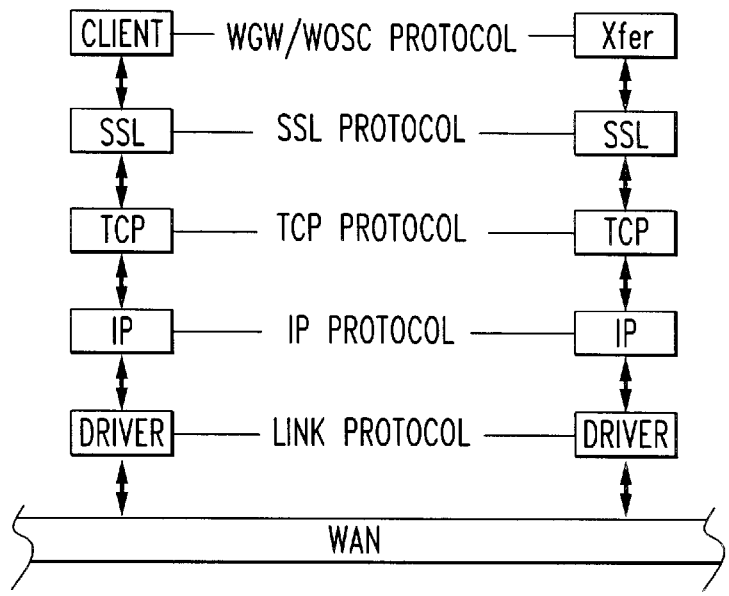
FIGS. 5 and 6 illustrate a multi-level protocol useful in implementing an embodiment of the present invention.

This protocol suite is implemented in both the gateway and the WOSC. Each layer in this protocol suite has a different responsibility and communicates logically with its peer layer in the other node. Physically, each layer, except the link layer, communicates with only the layer directly adjacent to it within its own node. The link layer connects to the private WAN for communication between the gateway and the WOSC. This is shown in FIG. 5. The actual link layer utilized would depend on the form of connection required between the WOSC and the WAN. Thus, the link layer required will be installation dependent.

Figure 6:
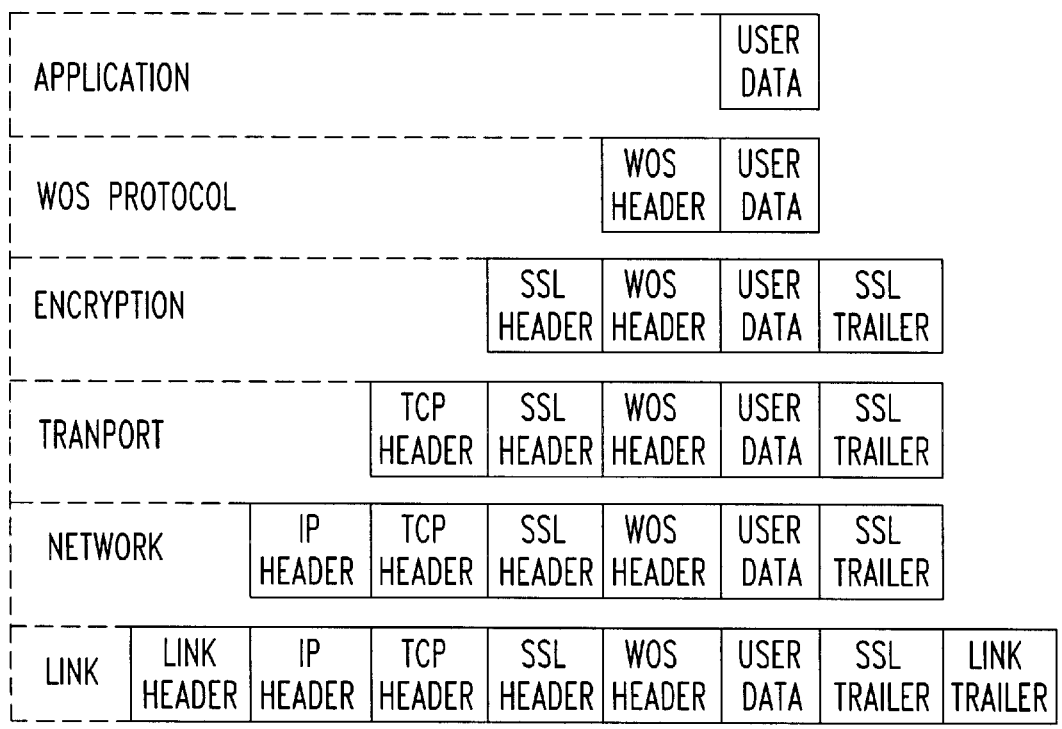

When the gateway or WOSC sends a message, the data are sent down the protocol stack, through each layer, until they are sent as a stream of bits across the network. Each layer adds information to the data by pre-pending headers (and sometimes appending trailer information) to the data it receives. When the message is received at the other node, the reverse occurs as each layer strips off its header (and trailer) and passes the remaining data to the layer above. FIG. 6 shows an example of a process of encapsulating a message on the gateway. In this example, SSL headers and trailers are employed. SSL pertains to authentication and encrypted communications between WOSC and the gateway. It is an additional layer that supports client/server authentication and encryption. The gateway supports communications with and without this additional SSL layer.

Note, the actual link layer utilized would depend on-the form of connection required between the WOSC and the WAN or the gateway and the WAN. Thus, the link layer required will be installation-dependent.

The communications paradigm between the gateway and the WOSCs is the standard client/server model, where the gateway performs the role of the server and the WOSCs perform the role of the clients. All communications occur through the stream transport service of TCP; therefore, the WOSCs must issue connect requests to the gateway prior to sending messages.

The gateway and the WOSCs may use fixed IP addresses provisioned at installation time. The gateway could be installed with an IP address for a private WAN. At installation, each WOSC could be provisioned with its own unique IP address as well as with the address of an assigned gateway. Alternatively, the WOSC could be provided with two or more gateway addresses to select from.

The gateway can utilize a non-negotiated, configurable IP Port Number for communication with a WOSC. That is, the IP Port Number that an individual WOSC uses to communicate with the gateway could be fixed and provisioned in the gateway database, not negotiated as part of the connection sequence between the gateway and the WOSC. The gateway can utilize multiple IP Port Numbers to communicate with the WOSCs it supports. Multiple WOSCs may be assigned the same gateway Port Number. Assignment of WOSC's to gateway port numbers is a matter of gateway engineering and load balancing.

Since communication between the gateway and WOSCs in this embodiment is through TCP/IP, a communications session must be established before any communication occurs. Since the WOSCs act as clients, it is their responsibility to establish and maintain the connection to the gateway.

Once the gateway is active, it will be waiting for a connect request from WOSCs. To establish a connection a WOSC should perform a connect ( ) call that specifies a port number and the IP address of the gateway.

If the application is taken down at either gateway or a WOSC, a close ( ) would be issued by the end going down to terminate the connection. If a WOSC crashes and is unable to issue a close ( ), it would issue another connect request when it resumes service.

The goal of the WOS Protocol is to be as simple as possible. The requirements of this protocol are:
1. Ensure proper distribution of WOSC network signaling and other configuration data from the gateway to the WOSC following communications session establishment;
2. Ensure that both the gateway and the WOSC are able to detect that it is no longer in contact with the other node;
3. Allow for transport of internal WOSC configuration and other data from the gateway to the WOSC; and
4. Allow transport of IS-41 (and other) and SCCP messages in both directions between the WOSC and the gateway;
5. Additionally, the protocol could be designed to support future transport of ISUP messages in both directions between the WOSC and the gateway. The message sequences and message structures for this protocol are described in the following sections.

Following the successful establishment of a communications session between the WOSC and the gateway, the gateway must distribute the network (e.g., SS7 network) and other mandatory configuration data to the WOSC. It does this via a WOSC Configuration Message. On receipt of a WOSC Configuration Message, the WOSC updates its internal data structures with the information contained in the message and returns a WOSC Configuration Response Message to the gateway. When the WOSC sends its WOSC Configuration Response Message, it goes In-Service with respect to the gateway and can begin exchanging other WOS Protocol messages. Until the WOSC sends its WOSC Configuration Response Message, it shall not accept any other messages from the gateway. When the gateway receives the WOSC Configuration Response Message, it marks the WOSC In-Service and can begin exchanging other WOS Protocol messages. Until the gateway receives the WOSC Configuration Response Message, it will not accept any other message from the WOSC nor shall it send any further messages to the WOSC. The gateway can provide a provisionable time-out for reception of the WOSC Configuration Response Message. If the WOSC Configuration Response Message is not received within this time-out, the gateway shall mark the WOSC as Out-of-Service, close the session, and close ( ) the TCP/IP connection to the WOSC. The WOSC Configuration Message may only be sent at the beginning of a session between the gateway and a WOSC. In order to distribute changes in the values of the parameters contained in the WOSC Configuration Message to a previously configured WOSC, it is required that the communications session be closed and reestablished. On re-establishment of a session, the new WOSC Configuration parameters are distributed to the WOSC.

Data exchanged between WOSCs and the gateway can be formatted as WOSMessage messages.

WOSMessage messages may be defined in terms of structures defined in Recommendation X.209: Specification of Basic Encoding Rules for Abstract Syntax Notation One (ASN. 1).

In the embodiment described, message processing and related functionality will be performed in the gateway by a WOS Gateway Transfer Manager (WGTM) application software executed on the gateway's processor(s). The primary purpose of the WGTM application in this embodiment is to transfer and route messages between the SSL/TCP/IP protocol stack and the SS7 protocol stack. The body of the messages transferred will be SS7 SCCP messages or ISUP messages. The bodies of these messages should be transparent to the WGTM application. The routing and addressing information contained at the SCCP and MTP layers will need to be examined and manipulated as part of the WGTM application functionality. In one embodiment, the SCCP messages are SCCP data related messages containing IS-41 MAP messages to facilitate general Mobile Telephony applications. In another embodiment, the SCCP messages are SCCP Management messages concerning the status of the MSC and VLR subsystems on the WOSC, or other nodes on the SS7 network. There is no requirement at the gateway, however, to restrict messages to these uses. That is, if new applications requiring SCCP messaging are added to the WOSC, these should require no changes to the gateway beyond possible expansion of data structures to accommodate additional routing and translation data.

There should be no need to change the basic message transfer functionality of the gateways. In addition, the WGTM application can detect SS7 and TCP/IP network failure conditions as well as routing provisioning errors that prevent the delivery of messages. For UDT or other SCCP messages being transferred between the SS7 and the TCP/IP networks, the WGTM application generates an appropriate UDTS or other corresponding message for routing back to the originator of the UDT message.

Figure 7:
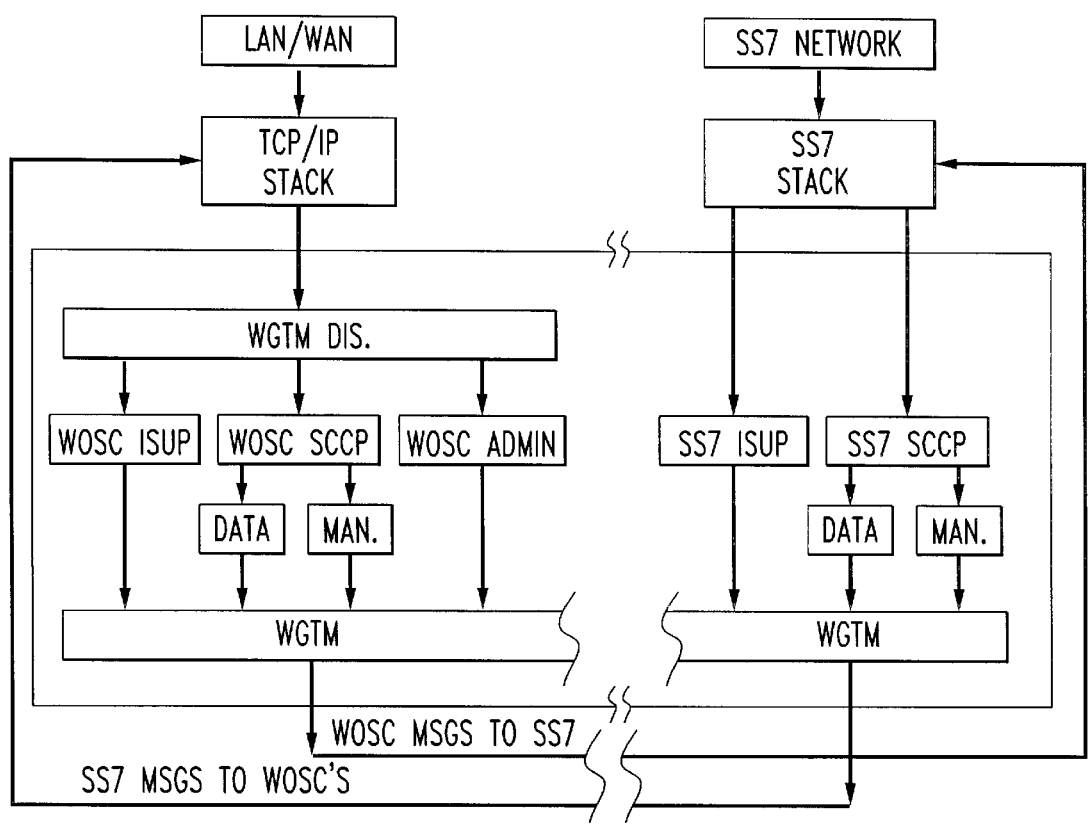
FIG. 7 is a block diagram of an embodiment of a gateway of the system of FIG. 2.
Figure 8:
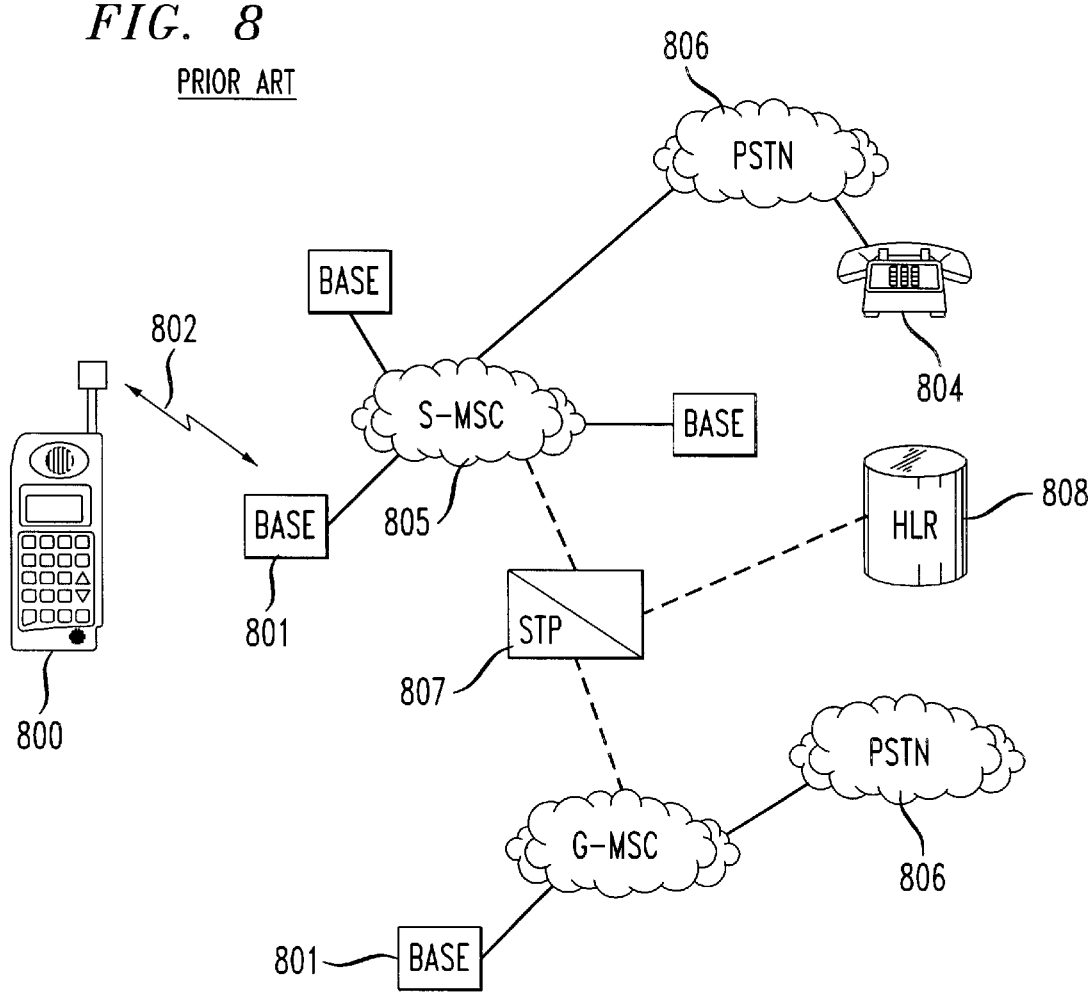
FIG. 8 is a block diagram of a prior art wireless communication system.

FIG. 7 shows an Architectural Reference model for the WGTM Application. Descriptions and requirements for the WGTM are based on this model. There is no requirement that the actual internal architecture conform to this model so long as the functional requirements are met.

FIG. 7 is divided into 2 halves, the WAN interface (the left half) and the signaling network interface (the right half).

The WAN Interface

At the top of the figure, packages arriving from the LAN/WAN are passed to the TCP/IP stack. At this interface to the TCP/IP stack (i.e., for messages from the LAN/WAN), TCP/IP header information is stripped off and packages are sent to the WGTM Security, Distribution, and Discrimination function for further routing. The WGTM security function decrypts the SSL encrypted message and passes the decrypted message to the discrimination function which discriminates between three different types of messages: ISUP messages (not yet implemented), SCCP messages, and Administration messages. WOSC Administration messages are passed intact (unchanged) to the WGTM. SCCP messages bound for WOSCs are discriminated further into SCCP Management (SCMG) messages and SCCP data (e.g., UDT, the type of message that carries IS-41 messages) messages. This additional discrimination is performed because under certain conditions the SCMG messages are not sent to the WOSCs; instead, under these conditions the gateway acts as a proxy or surrogate for WOSCs since they are unable to respond directly.

Within the WGTM block, it is determined if messages are bound for nodes on the SS7 network or for other WOSCs subtended by this gateway. In the former case the messages are formatted as complete SS7 messages (sending WOSCs' IP addresses are matched with their SS7 Point Codes for identifying the sending WOSCs to the SS7 nodes) and sent to the SS7 stack for transport via SS7 protocols. For messages bound for WOSCs subtended by this gateway the messages are formatted according to TCP/IP formatting (destination WOSCs' SS7 point codes are converted to IP addresses for identifying the destination WOSCs to the LAN/WAN) and they are passed back to the TCP/IP stack for transport via TCP/IP protocols.

At the TCP/IP Stack Interface, messages arriving from the LAN/WAN are passed to the WGTM Distribution and Discrimination function; messages arriving from other internal processes are routed back to the LAN/WAN.

SS7 Network Interface

At the top of the figure, packages arriving from the SS7 network are passed to the SS7 stack. At this interface to the SS7 stack (i.e., for messages from the SS7 network) SS7 MTP information is stripped off and address information therein is used to verify that packages are to be sent to the WGTM Distribution and Discrimination and encryption function for further routing. The WGTM distribution function discriminates between two different types of messages: ISUP messages (not yet implemented) and SCCP messages. SCCP messages bound for WOSCs are discriminated further into SCCP Management (SCMG) messages and SCCP data (e.g., UDT, the type of message that carries IS-41 messages) messages. This additional discrimination is performed because under certain conditions the SCMG messages are not sent to the WOSCs; instead, under these conditions the gateway acts as a proxy or surrogate for WOSCs since they are unable to respond directly.

The WGTM block processes messages bound for WOSCs subtended by this gateway. The messages are formatted as WOSC messages (receiving WOSC nodes' SS7 Point Codes are converted to receiving WOSC IP addresses) encrypted according to SSL standards and sent to the TCP/IP stack for transport over the LAN/WAN.

At the SS7 Stack Interface, messages received from the SS7 network are stripped of SS7 MTP information and address information therein is used to verify that packages are to be sent to the WOSCs subtended by this gateway. These messages are sent eventually to the WGTM. Messages received at the SS7 Stack Interface from other internal processes are completely formatted SS7 messages and are routed back to the SS7 network.

There is considerable overlap in the data that needs to be provisioned for the WGTM application and the data that are needed by the SS7 middleware software. For those items required by both applications, the WGTM shall be used to provision its data structures and then shall distribute the data as required to SS7 middleware software data structures using SS7 middleware's API.

As part of the network security, it is appropriate that the gateway authenticate that the node at a particular TCP/IP address is the WOSC that it expects. Also, the WOSC needs to authenticate that it is connected to a legitimate gateway. This authentication can be accomplished using the Server and Client authentication procedures of the SSL Protocol. Using these procedures requires that an Authentication Certificate be created for each gateway and each WOSC at the time of its installation.

To generate the required Authentication Certificates, the network provider could provide a Certification Authority capable of providing X.509 certificates at the request of WOS customers during WOSC installation. The Certification Authority may have general characteristics similar to the Netscape Certificate Server application.

Use of a Certification Authority server implies that the gateway and the WOSCs must be capable of either:

1. executing the certificate request protocol, including generation of the public key/private key pair needed to generate the certificate; or
2. accepting input of the certificate and its associated private key from an external device (e.g., a PC) capable of executing the certificate request protocol.

The choice of how the certificate request is generated and handled could be left to WOSC vendors. Additionally, it should be possible to revoke a WOSC's or a gateway's current Authentication Certificate and replace it with a new one. This could be required if there was reason to believe that the existing certificate and/or its associated private key had been compromised. Revocation/Replacement of an Authentication Certificate in either the gateway or WOSC should automatically cause regeneration of all affected session keys. This also requires that the Certification Authority server maintain a Revoked Certificate List (RCL) and that this list be checked during SSL Handshake protocols between the gateway and WOSC.

A possible format of the Authentication Certificates used by the gateway and WOSC during Node authentication is defined by the ITU X.509 specification.

The gateway can also be instrumental in dealing with network information. As used herein "Network information" is that information used by the SS7 network to locate, identify and route information to nodes in the network. As such, it has impacts beyond the individual WOSC nodes. Since WOSC nodes are Customer Premises Equipment that may be owned and operated by individual wireless office service customers and not by the network provider, there may be concerns about the provisioning of Network related information in the WOSCs. Specifically, it may not be practical or allowable for network provider personnel to physically access each WOSC during installation to provision network related information. Likewise, there are concerns about the ability of customer personnel being able to provision this information accurately. Also, giving customers the ability to change Network related information at the WOSCs themselves opens up possibilities for inadvertent changes to critical information during other, normal and unrelated provisioning and maintenance operations. Therefore, to ensure accuracy, reliability and consistency, provisioning of Network information to individual WOSC systems can be handled at the gateway and distributed from the gateway to WOSCs during the initial connection.

The gateway transmits Network related information to a WOSC whenever the WOSC initializes a TCP/IP link between it and the gateway. This is done to simplify the protocol between the two nodes. That is, if the LAN/WAN connectivity is broken, the gateway can assume that a WOSC outage has occurred and that the WOSC has lost the Network information. While this may not always be the case, it is a 'safe' assumption in that if the information has been lost, it needs to be re-established while if it has not been lost, re-sending the same information does no harm. This scheme also eliminates the need to explicitly accommodate longer outages where the network information may have changed while the WOSC was unreachable. That is, when the LAN/WAN connectivity is re-established the new Network information is sent and replaces the older, possibly invalid information that was present in the WOSC.

Transmission of WOSC Network related information shall occur only after the WOSC has successfully authenticated itself to the WGW using the Authentication procedures referred to above.

With regard to OAM&P at the WOSC, the WOSC should be allowed to view, but not modify, certain Network information not critical to network structure or addressing. This may be a requirement for both local and remote interfaces and the connection to any network operations center.

As for information such as SCCP Error Handling and Recovery, this can be handled in a simplistic manner. If the LAN/WAN connection between the gateway and the WOSC is active and In-Service, all SCCP subsystems on the WOSC shall be considered Available from an SCCP perspective. Whenever the TCP/IP connection between the gateway and the WOSC is active and In-Service, all SCCP messages addressed to the WOSC, regardless of subsystem, shall be forwarded to the WOSC. It shall be the responsibility of the WOSC to compose and transmit back to the originator any UDTS message required when a specific subsystem at the WOSC is not available. The WOSC can count the number of occurrences of messages for invalid subsystems (not Out-of-Service subsystems) and generate a log for each occurrence indicating the invalid subsystem number.

Likewise, if the LAN/WAN connection between the gateway and the WOSC is not active and In-Service, it is the responsibility of the gateway to return a routing failure UDTS message back to the originator of the SCCP message. In the other direction, there may be no requirement for the gateway to inform WOSCs of Routeset failures on the SS7 side of the gateway. If the LAN/WAN connection between the WOSC and the gateway is active and In-Service, the WOSC shall transmit messages to the gateway. It can be the responsibility of the gateway to return a routing failure UDTS messages back to the WOSC when it can not forward the message to the SS7 network due to Routeset failure. This is consistent with what would occur had the routing failure occurred at a point in the SS7 network past the gateway. The gateway can count the number of these events on a per WOSC basis, but might not generate a log or alarm for such.

If the gateway fails to forward a message from a WOSC to the SS7 network because it can not find a suitable route as part of its provisioned data, it could also return a routing failure UDTS message to the WOSC. In addition, it can count the event and generate a log and alarm for the invalid address situation.

The gateway has a dual nature in the SS7 network. In some respects, it serves in the role of an STP for routing of a message to other Point Codes within the network. However, in other respects, it is a Signaling End Point (SEP) in that it converts messages from an SS7 MTP protocol to a TCP/IP protocol.

Also, the gateway serves WOSCs that are Customer Premises Equipment (CPE) and may be designed to provide a significant degree of strictly WOS related services (e.g., WOSC Provisioning) without a link to the SS7 network. Therefore, the reliability and availability requirements for the gateway could be assumed to be lower than those typical of other network equipment.

Specifically, there is no assumption of a dual/redundant or active/standby internal architecture for the gateway. That is, the gateway may be assumed to be a simplex device. In addition, there is no requirement that gateways must be deployed in a mated-pair STP-like structure as is typical in SS7 networks. In a single gateway deployment, it is acceptable that a single gateway serves all WOSCs connected to that gateway from the SS7 network.

If greater reliability is required, it will be provided at the network, and not the node, level. That is, gateways may be deployed as a mated-pair of redundant nodes to ensure connectivity between all or some set of WOSCs and the SS7 network.

SCCP management functionality of WOS nodes may also be simplified by having the operational state of the WOSC itself and its IS-41 related SCCP subsystems (i.e., MSC and VLR subsystems) represented as a single value, that is, the entire WOSC is either available or unavailable. The concept discussed in SS7 standards of layered and disjoint availability states of Signaling Points and Subsystem(s) is not be applied to WOSCs in this embodiment. This assumption reduces overall application management to that of simply Signaling Network Management.

SUMMARY

The present invention provides an arrangement wherein a controller generating messages consistent with a first network protocol can communicate those messages to that network without using a dedicated direct network connection. In the invention, the generated messages are wrapped in a package corresponding to a second protocol and transported to a gateway that unwraps the message and forwards it to the first network. The gateway provides messages to the controller from the first network in a similar manner. The gateway need not be able to operate on the messages themselves other than to wrap or unwrap them. As a consequence, a plurality of controllers such as a wireless office system controllers can share an access point to a signaling network that has a particular access requirement. The above embodiment is described in terms of providing an interface to a SS7 signaling network for IS-41 messages. It should be recognized that the technique of the present invention of wrapping messages of a first protocol into a signal of a second protocol could also be employed to provide access to other signaling networks or from other SS7 compatible messages sources.

What is claimed is:

1. An apparatus for interfacing a customer premises wireless office system to a remote signaling network, the apparatus comprising:
   a digital switch; and
   a controller, coupled to the digital switch and including a wide area network interface, adaptively configured to:
   generate a signaling message conforming to a remote signaling network protocol, and
   wrap the signaling message within a wide area network protocol.

2. The apparatus of claim 1 wherein said control message processor is IS-41 compatible.

3. The apparatus of claim 1, wherein the digital switch includes at least one of a base station interface and a PBX interface.

4. A method for facilitating access from a customer premises wireless office system to a remote signaling network, the method comprising the steps of:
   generating, at a customer premises wireless office system controller, a first message compatible with a protocol of said remote signaling network;
   wrapping, at the customer premises wireless office system controller, said first message in a wide area network protocol, including an address associated with a gateway to said remote signaling network; and
   transmitting the wrapped message from the customer premises wireless office system controller to a wide area network.

5. The method of claim 4 wherein said first message is compatible with an IS-41 format and said wide area network protocol includes TCP/IP.

6. The method of claim 4 comprising the further steps of:
   receiving a return message including a wrapped second message from the wide area network, said second message being compatible with said protocol of said signaling network; and
   retrieving said second message from the received return message.

7. The method of claim 6 wherein said first message is compatible with an IS-41 format and said wide area network protocol includes TCP/IP.

8. A method for routing signaling messages between a customer premises wireless office system and a remote signaling network, comprising:
   generating a signaling message at a customer premises wireless office system controller;
   encapsulating the signaling message in a wide area network protocol message; and
   transmitting the encapsulated message to a gateway over a wide area network.

9. The method of claim 8, further including:
   unwrapping the signaling message from the encapsulated message; and
   transmitting the signaling message to a signaling network device over the signaling network.

10. The method of claim 9, further comprising:
    generating a signaling message response at the signaling network device;
    transmitting the signaling message response to the gateway over the signaling network;
    encapsulating the signaling message response in a wide area network protocol message response;
    transmitting the encapsulated message response to the customer premises wireless office system controller over a wide area network; and unwrapping the signaling message response from the encapsulated message response.

11. The method of claim 8, wherein the wide area network protocol is an encrypted multilayered protocol.

12. The method of claim 11, wherein the wide area network protocol includes at least one of SSL, TCP/IP, and Ethernet.

13. The method of claim 8, wherein the remote signaling network is an SS7 network.

14. The method of claim 13, wherein the signaling message is consistent with at least one of IS-41 and GSM MAP protocols.

15. The method of claim 13, wherein the signaling network device is one of a mobile switching center, a home location register, and a signal transfer point.

* * * * *